Nov. 10, 1953     E. D. DALL     2,658,779
LATCH MECHANISM
Filed Feb. 10, 1950     3 Sheets-Sheet 1
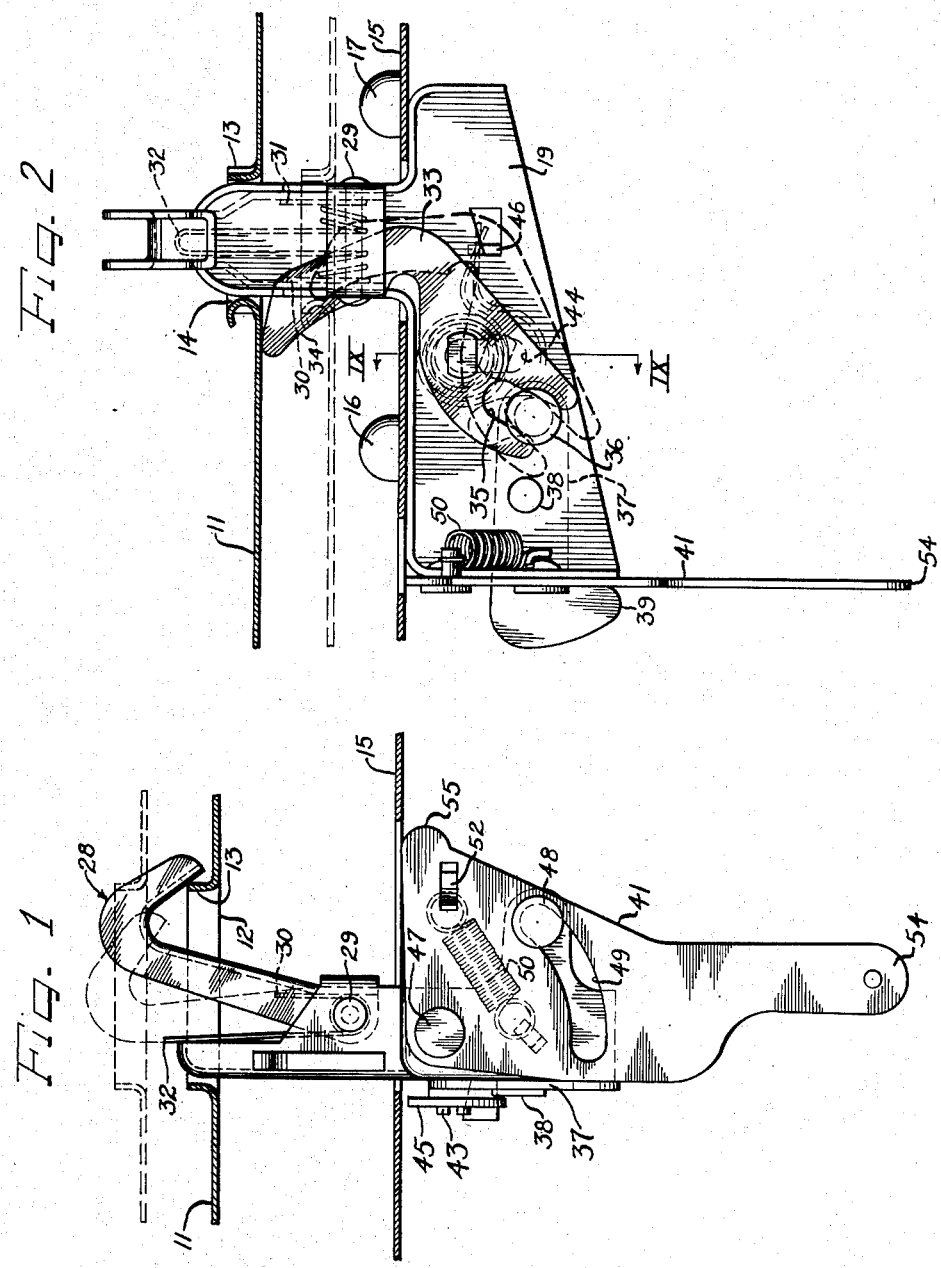
Inventor
Edward D. Dall

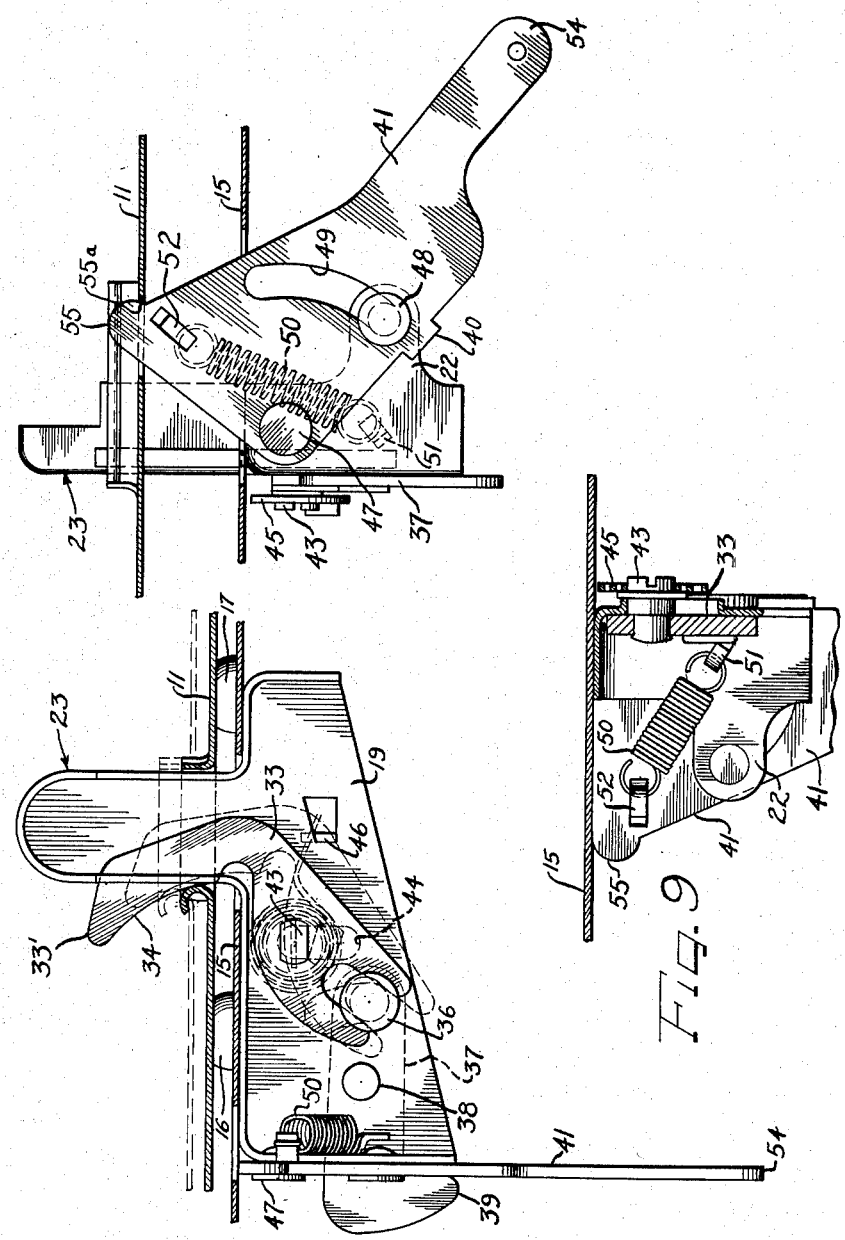

Nov. 10, 1953  E. D. DALL  2,658,779
LATCH MECHANISM
Filed Feb. 10, 1950  3 Sheets-Sheet 3
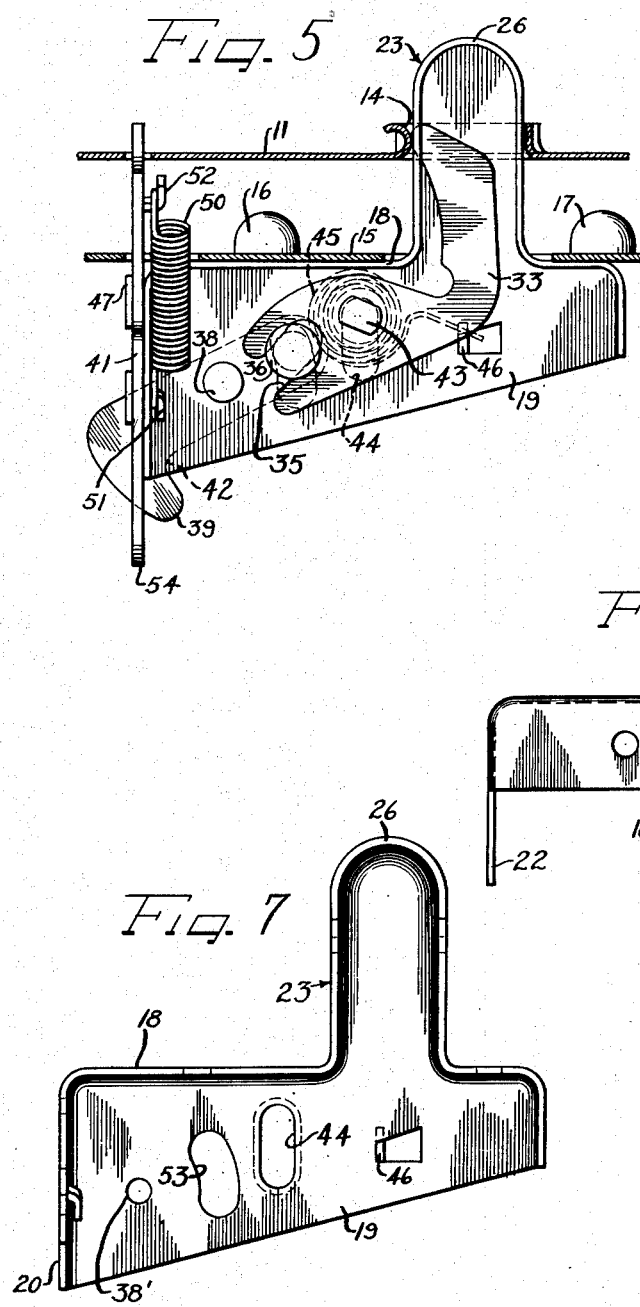
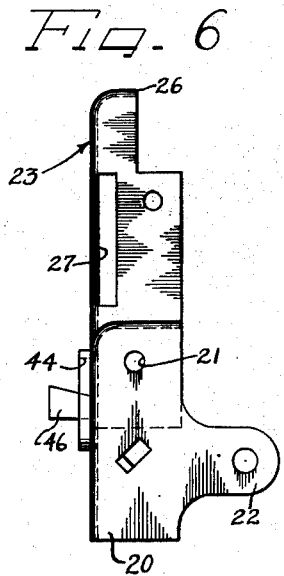
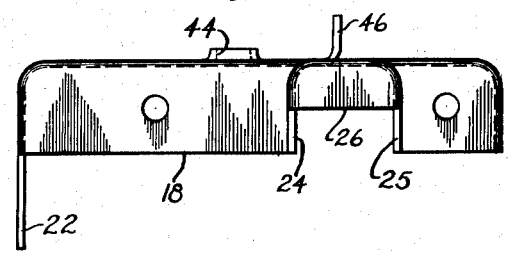
Inventor
Edward D. Dall Patented Nov. 10, 1953

2,658,779

UNITED STATES PATENT OFFICE 2,658,779

LATCH MECHANISM

Edward D. Dall, Detroit, Mich., assignor to Houdaille-Hershey Corporation, Detroit, Mich., a corporation of Michigan Application February 10, 1950, Serial No. 143,556

7 Claims. (Cl. 292—66)

This invention relates to a latching mechanism for use on automobiles, which may be employed either for latching automobile hood covers of the "alligator" type, or for latching side doors of vehicles.

In the illustrated embodiment as shown herein the mechanism is particularly adapted for latching automobile covers of the alligator type hinged at their rear ends along a hinge line extending transversely of the vehicle.

As to this type of hood latch it is a current requirement that it lock or latch automatically when the hood cover is moved downwardly into closed position, and that the latch mechanism be capable of release from some remote point inside of the vehicle.

It is a further frequent requirement that there also be a safety latch mechanism associated which will prevent the hood from rising to its normal full height or normal wide open position in the event that the latch be inadvertently released from the tighly closed position.

The invention aims to provide a main latch mounted for pivotal and sliding movement, together with dogging or latch retaining means adapted to hold the latch, when in latched position, against unlatching movement, but permitting further movement thereof in a latching direction.

Another object of the invention is to provide a latch mechanism having the foregoing features adapted to hold the latch in a tight closure holding position but providing means for releasing the latch with a small amount of pressure.

Another object of the invention is to provide a latch mechanism adapted for mounting upon relatively movable closure members and so constructed as not to require an accurate predetermined alignment of the closure members relatively to the latch mechanism in order to obtain satisfactory and completely effective functioning of this latch mechanism.

Another object of the invention is to provide a latch mechanism having a main latch member which after being engaged in latching position is capable of automatically shifting into a further latched position if there be a subsequent relative movement of the closure members one toward the other.

A further object of the invention is to provide an improved latch mechanism having the foregoing advantages and adapted to perform latching functions in an improved manner.

Further objects and advantages of the invention will become apparent from a perusal of the specification wherein a preferred embodiment of the invention is illustrated.

Figure 1 is a side elevation showing the latch mechanism mounted on the stationary body of a hood and holding the hood cover in safety catch position.

Figure 2 is a front elevation of the same latch mechanism showing the hood cover moved downwardly to the position where it engages the main latch.

Figure 3 is a front elevation showing the latch mechanism in hood latching position.

Figure 4 is a side elevation showing the latch release lever in released position.

Figure 5 is a front elevation showing the main latch released and retracted as the hood rises.

Figure 6 is a side elevation of the latch plate or casing, on which the latch mechanism is mounted, this plate being mountable on the fixed enclosure member or hood body.

Figure 7 is a front elevation of the same latch mounting plate.

Figure 8 is a top plan view of the latch mounting plate.

Figure 9 is a vertical sectional view on line IX—IX of Figure 2.

Referring further to the drawings, and recalling that this embodiment of the latch mechanism is intended for use with an alligator type of automobile hood, a portion of the movable hood cover is shown and indicated at 11, this portion of the hood cover being apertured at 12. Surrounding the aperture is an upstanding flange 13, having one portion thereof, that is the portion to be engaged by the main latch, curved and shaped as at 14 to provide a keeper in the form of a rounded rigid member to be engaged by the main latch.

The upper margin of the fixed portion of the hood body is usually provided with a horizontal plate or flange, and such plate or flange is indicated as 15, and on this will be mounted the customary impact rubber buttons such as 16 and 17.

The latch mounting plate will now be described. This plate is preferably a stamping formed from a single sheet of metal, although not necessarily so. It includes the horizontal flange portion 18 which may be riveted or welded to the horizontal flange of the hood body. Depending therefrom is a vertical plate 19 mounted parallel to the front end of the vehicle. At right angles to the plate 19 is a vertical flange 20 on which at the pivot pin hole 21 is pivotally mounted the latch release lever, subsequently to be described. The ear 22 provides a mounting position for a rivet having an enlarged head for guiding the rotation of the latch release lever.

Upstanding from the flange 18 of the mounting plate, a distance sufficient so that it protrudes into the hood cover when the latter is closed, is a channel member generally indicated as 23 having a pair of laterally extending ears 24 and 25 upon which the safety catch or safety latch is pivotally mounted. An edge portion 26 at the upper end of the channel member provides a stop to limit the unlatching rotation of the safety catch. A vertical slot 27 which can be seen in Figs. 6 and 1 provided in the channel member 23 affords an opening through which the latching end of the hood latch protrudes when it is in projected position.

Referring next to the safety catch, this member is generally indicated as 28 and preferably has a transverse cross section throughout its entire length of channel shape, and is pivotally mounted upon the ears 24 and 25 of the latch mounting plate by means of a pivot pin 29. A spring coiled about the pivot pin has one pair of ends 30 and 31 pressing against the inside wall of the safety catch while the looped end 32 of the spring rests against the edge 26 of the mounting plate to thereby bias the safety catch so that it tends to rotate always in a clockwise direction, as Fig. 1 is viewed.

It will be apparent from Fig. 1 that when the hood cover is in the safety catch position shown in Fig. 1 the nose of the safety catch may engage over the flange 13 on the hood cover to hold the hood cover from further opening movement, but that it may be retracted to release the hood cover completely, if an attendant will insert a hand between the hood body and the hood cover and push the safety catch back into retracted position.

Referring now to the main hood latch itself, which is generally designated as 33, this latch member has a latching nose 33' which normally projects through the slot 27 in the upper channel member of the hood latch mounting plate. The top surface of the nose 33' may be termed a strike surface. A curved downwardly facing latching or keeper engaging surface 34 is provided thereon for latching engagement with the curved flange portion 14, the latter being integral with the hinged hood cover.

The lower end of the main latch 33 is bifurcated as shown to provide an open ended slot 35 offset laterally from the longitudinal axis of a slot 44 in the latch plate. The slot 35 at all times embraces a rivet having an enlarged head 36 which is fixed in and near one end of the latch dog 37, the latter being pivoted on a pin 38 mounted in the aperture 38' of the mounting plate (Fig. 7). The other end of the latching dog extends beyond the depending flange 20 of the mounting plate and has a locking nose 39 sufficiently spaced from the outer face of the flange 20 to permit the projection 40 on the latch release lever 41 to engage just under the inner corner 42 of this latching dog, thereby to prevent, when the hood latch is latched, the latching dog from rotating in a counterclockwise direction as Figs. 2 and 5 are viewed.

The hood latch 33 is further provided with a post 43 non-rotatably fixed in the latch and extending laterally from the latch through the slot 44 in the latch mounting plate. The slot 44 extends in the general plane or direction of hood closure movement and forms a rectilinear guide for the latch member 33 cooperating with the slot 35 so as to provide rotation of the latch member as it rectilinearly moves along the slot 44 to its projected latching position. The end of the post which projects through said slot is provided with a kerf in which is crimped one end of a coiled spring 45, coiled to be maintained under pressure tending to unwind it, the other end of which spring 45 is anchored or engaged over an ear 46 struck out from the mounting plate.

Assuming for the moment that the parts are in the dotted line position for the hood latch illustrated in Fig. 3, the effect of the spring 45 is to tend to raise the post 43 vertically in the slot 44, while the bifurcated lower end of the latch is engaged with the headed post 36 mounted on the latching dog, which at that time is held stationary by release lever 41. Thus the spring 45 tends to raise the latching nose 33' of the latch member 33 further into a latching position, and the coaction between the bifurcated end of the latch, the post 36 relative to which it moves and the slot 44 tends also to rotate the latch member in a counterclockwise direction, as Fig. 3 is viewed, as the latch is rising.

The latch release member 41 is pivotally mounted on a post 47 mounted in the aperture 21 of the mounting plate. A guide rivet 48 fixed in the projection 22 of the mounting plate has an enlarged head outside of the curved slot 49 in the release lever, for guiding and limiting the rotation of the release lever. A tension spring 50 anchored to the ear 51 struck out from the mounting plate and connected to an ear 52 struck out from the side of the release lever tends normally to restore the release lever to the position shown in Figure 1 whenever it has been operated and then released, which will place the nose or projection 40 of the release lever underneath the latching dog at the inner corner 42 thereof.

An arcuate slot 53 provided in the mounting plate and through which the post 36 extends, guides the rotation of the latching dog and limits its rotation in both directions.

It will be understood that the lower end 54 of the latch release lever should be connected by means of some link mechanism such as a wire or rod, to a control lever mounted at the dash position of the automobile, so that from the interior of the car the hood latch may be released by pulling a release lever to rotate it counterclockwise as Figure 1 is viewed. A rounded shoulder or engaging end 55 is provided as shown on the release lever, to engage the under side of the hinged hood cover 11 and initially lift the hood cover to the position shown in Figure 4. When in this position the shoulder 55 will enter a slot 55a in the hood cover 11 and will be held in this extreme counterclockwise position against the force of spring 50, by engagement of the shoulder 55 with the edge of the slot 55a. This will hold the hood in position for the fingers to release the safety catch 28 and further open the hood. At this time the lever 41 will be released and returned to its latching or dogging position by the spring 50.

The latch mechanism operates as follows. Since the operation of the safety catch has heretofore been described, the following explanation will be devoted to the main latch itself. Referring first to Figs. 1 and 2 and assuming that the hood cover is fully raised and the latch release lever is in locking position, as shown in Fig. 1, and that the latch dog 37 occupies the dogging position shown in Fig. 2, the latch 33 will be fully projected upwardly to the same position it occupies when the hood cover is tightly latched. If the hinged hood cover now be lowered, the safety catch will be cammed back as it passes through the aperture 12, and then projected to the position shown in Fig. 1. When the hood 11 reaches the position shown in Fig. 2, the underside of the hood cover will engage the upper surface of the latching nose 33. Further downward movement of the hood cover, for example by the operator pushing it downwardly with his hand, enables the hood cover to force the latching nose of the hood latch downwardly. Since the post 43 is free to move vertically downwardly in the slot 44 and the open ended slot 35 may simultaneously ride along the post 36 both of these results will occur as the hood is being closed. The latching nose will not only thus be lowered, but it will also rotate clockwise and move out from under the hood plate 11 until it is retracted far enough to have moved wholly within the aperture provided by the upstanding flange 13. This effect is shown in the dotted line position of the latch in Fig. 2, after which as the hood cover further closes the spring 45 will raise the hood latch and rotate it in a counterclockwise direction to one of the positions shown in Fig. 3, or any intermediate position therebetween, any of which is adequate to firmly latch the hood cover. Note that during these movements of the latch, the dog 37 does not move. If the hood cover be forced down hard enough to compress the rubber buttons adequately, the hood latch may rise until it attains the full line position shown in Fig. 3. But in any event once the curved surface 34 has engaged over the rolled edge 14, the hood cover is firmly latched and force applied to the hood cover to raise it will not effect a retracting movement of the hood latch.

It will be apparent that if the cover be not closed as tightly as the rubber impact buttons might permit it to close, the normal vibration of the automobile in travel will tend to tighten the hood cover down, for with each relative movement of the hood cover toward the hood body the spring 45 will tend to raise and rotate the latch member to prevent subsequent upward rotation of the hood cover from any lowered position to which it may have advanced.

It is apparent that if the hood cover be tightly closed and the hood latch be rotated and raised by its spring to hold the hood latch in tightly closed position, the pressure of the bifurcated end of the hood latch upon the post 36 carried by the latching dog will have increased in proportion to the tightness of the hood closing. However, it will also be perceived that while this increased pressure on the post 36 tends to rotate the latching dog in a counterclockwise direction as Fig. 3 is viewed, the increased pressure between the nose 39 of the latching dog and the projection 40 of the release lever is not sufficient to noticeably increase the difficulty of withdrawing the release lever from its locking position. Consequently, while this latching mechanism is designed to adapt itself readily to very tight hood latching this advantage does not result in increased difficulty in releasing the latch mechanism.

When the hood is latched, any upward thrust thereon will merely cause the keeper 14 to engage the latch surface 34 more tightly, while the dog 37 will prevent the latch from rotating away from the keeper.

It is customary for hood covers of the alligator type to be so hinged and spring loaded as to be self-raising from the fully latched position when released, hence the use of the safety latch position to stop the raising at that point in the event of some inadvertent release of the main latch. However, when the safety catch position is reached an attendant or the operator may readily retract the safety catch and raise the hood or allow it to raise itself to its fully open position. When the hood is raised and the release member 41 is released after having been retracted, the effect of the spring 45 is to raise the post 43 to the upper end of the slot 44 while the bifurcated lower end of the latch acting on post 36 will restore the latch dog to the horizontal position shown in Fig. 2 at which it is lockingly engaged by the release lever. Hence, a subsequent lowering of the hinged hood cover will accomplish the hood latching effect heretofore described. The fact that one end of the spring 45 is anchored in a kerf or crimped in a kerf provided in the non-rotatable post 43 contributes to the tendency of the latch always to rotate in a counterclockwise direction as Fig. 3 is viewed.

It will be understood that modifications and variations may be effected in this invention without departing from the scope of the novel concepts of the present invention.

I claim as my invention:

1. In a hood latch for association with a keeper, a latch assembly including a latch plate, a releasable holding lever pivoted thereon, a dogging lever pivoted on said latch plate and releasably engaged by said holding lever and held stationary in a dogging position thereby, a slot extending along said latch plate in the general direction of hood closing movement, a latch, a pin pivotally mounting said latch in said slot for movement therealong, a torsion spring operatively connected with said latch and urging said latch to pivot into engagement with the keeper and to move along said slot in a direction toward said keeper, a slidable controlling engaging connection between said dogging lever and latching lever controlling retractible movement of said latching lever during hood closing movement by engagement with the keeper and controlling movement of said latching lever into engagement with the keeper by said spring, when the hood is closed.

2. In a hood latch for association with a keeper, a latch assembly including a latch plate, a dogging member pivotly mounted on said latch plate, a releasable holding member for holding said dogging member stationary in a dogging position, a latch, a pivot pin for said latch, said latch being mounted on said latch plate on said pivot pin for pivotal movement with respect thereto, and for rectilinear slidable movement along said latch plate toward and from a keeper, a spring connected between said latch plate and latch and biasing said latch toward the keeper, said latch having a strike surface at one end thereof and a latching surface extending from said strike surface at an acute angle with respect to the path of rectilinear movement of said latch toward and from the keeper, and guide means slidably connecting said dogging member with said latch at the opposite side of said pivot pin from said strike surface and offset laterally from the path of rectilinear movement of said latch along said latch plate, and guiding said latch to project its latching surface in a generally arcuate path along the keeper under the bias of said spring, and positively holding said latch from retractible movement independently of said spring upon the attempted movement of the keeper away from said latch.

3. In a latch mechanism for association with a swingable closure member and a cooperating member, a latch casing for mounting on one of the members and extending in the general plane of closure movement, a latch, a pivot pin for mounting said latch on said latch casing, for pivotal and rectilinear slidable movement along said casing toward and from the other member, a dogging member pivotally mounted on said casing and movable between a stationary dogging and a movable released position, means offset laterally from said pivot pin and the path of rectilinear slidable movement of said latch along said casing, slidably connecting said dogging member with said latch, releasable means selectively operable to hold said dogging member in a stationary dogging position, a torsion spring on said pivot pin and connected between said casing and latch for pivotally and rectilinearly shifting said latch into a projected latching position when said dogging member is held stationary in a dogging position, said latch having a strike surface on the opposite side of its pivotal axis from its slidable connection with said dogging member and having a latching surface extending from said strike surface at an acute angle with respect to the path of rectilinear movement of said latch along said latch casing, and the angle of said latching surface with respect to the path of rectilinear slidable movement of said latch and the slidable guiding connection between said dogging member and said latch being such that said spring will force said latching surface to rectilinearly and pivotally move along the keeper to take up on the keeper upon movement of said latch and keeper toward each other and will block closure opening movement of said latch independently of said spring, upon the application of force against the keeper, tending to rotate said latch away from the keeper.

4. In a latch for association with a keeper, a latching assembly including a latch plate, a dogging member pivotally mounted on said latch plate, a release lever on said latch plate for holding said dogging lever in a stationary dogging position, a latch, a pivot pin mounting said latch on said latch plate for pivotal movement and for rectilinear slidable movement along said latch plate toward and from the keeper, said latch having a strike surface on one of its ends with a latching surface extending therefrom at an acute angle with respect to the path of rectilinear movement of said latch along said latch plate, cooperating guide means between said dogging member and said latch at the opposite side of said pivot pin from said strike surface and extending at an acute angle with respect to the path of rectilinear movement of said latch along said latch plate, and guiding said latch to rectilinearly and pivotally move into engagement with a keeper during door closing movement, and a spring connected between said latch plate and latch and biasing said latch to move rectilinearly along said latch plate toward the keeper and reacting against said dogging member to accommodate retractable movement of said latch upon striking the strike surface thereof with the keeper and projecting said latching surface to move along the keeper and take up on the latch during door closing movement.

5. In a latch mechanism for association with a closure member and a cooperating member, a latching assembly mounted on one of said members and including a latch plate having a slot extending therealong in the general plane of closure movement, a dogging member pivotally mounted on said latch plate, a locking lever releasably engaging said dogging member and holding said dogging member in a stationary dogging position, a latch having a strike surface at one end thereof, a pivot pin pivotally mounting said latch for movement along said slot and for pivotal movement about the axis of said pivot pin, said latch having a latching surface extending from said strike surface at an acute angle with respect to the longitudinal axis of said slot in all positions of said latch with respect to said slot, a torsion spring on said pivot pin and secured to said latch plate and to said latch and projecting said latch along said slot toward the other member, means slidably connecting said dogging member with said latch in laterally spaced relation with respect to said slot and along an acute angle with respect to said slot and reacting against said latch and torsion spring, to accommodate said latch to move to a retracted position upon engagement with the keeper and then holding said latch to be projected into engagement with the keeper along its latching surface, and maintaining said latching surface in engagement with the keeper independently of said spring.

6. In a hood latch for association with a movable hood and a stationary cooperating member, a latch casing on the stationary member and extending in the general plane of hood closure movement, a latch carried by said casing and having an end strike surface, a pivot pin forming a pivot for said latch and a guide member therefore, guiding said latch to bodily move along said casing toward and from the movable hood, a dogging member pivotally mounted on said casing, means slidably connecting said dogging member with said latch at a point spaced laterally from the path of rectilinear movement thereof, releasable means mounted on said casing and selectively operable to hold said dogging member in a stationary dogging position, a spring connected between said casing and said latch and projecting said latch for rectilinear and pivotal movement along said casing toward the hood when said dogging member is in a stationary dogging position and accommodating retractible movement of said latch upon engagement of the strike surface thereof by the hood, upon hood closure movement, said latch having a latching surface extending from said strike surface at an acute angle to the path of rectilinear movement of said latch along said casing, and the relationship between the latching surface of said latch, the path of rectilinear movement of said latch along said casing and the slidable guiding connection between said dogging member and said latch being such as to positively hold said latch from unlatching movement independently of said spring when said dogging member is in a stationary dogging position and a force is exerted on said hood in an opening direction.

7. In a hood latch for association with a movable hood and a stationary cooperating member, a latch casing on the stationary member and extending in the general plane of hood closure movement, said casing having a slot extending vertically therealong in the plane of hood closure movement, a pivot pin slidably mounted in said slot, a latch mounted on said pivot pin intermediate its ends and having a strike surface on one end thereof and a guide slot extending along the opposite end thereof, said latch having a latching surface extending from said strike surface at an acute angle with respect to the longitudinal axis of said slot in said casing, a dogging member pivotally mounted on said casing, means slidably connecting said dogging member with said guiding slot in said latch, and positioned laterally with respect to the longitudinal axis of said slot in said casing, releasable means mounted on said casing and selectably operable to hold said dogging member in a stationary dogging position, and a torsion spring mounted on said pivot pin and connected between said casing and latch and biasing said latch to react against said dogging member and move upwardly along said slot in said casing in projected relation with respect to said cooperating member, when said dogging member is held in a stationary dogging position.

EDWARD D. DALL.

References Cited in the file of this patent

UNITED STATES PATENTS

| Number | Name | Date |
|---|---|---|
| 465,517 | Birney | Dec. 20, 1891 |
| 1,368,276 | Mathews | Feb. 15, 1921 |
| 1,573,866 | Rogers | Feb. 23, 1926 |
| 1,815,181 | Biename | July 21, 1931 |
| 1,874,230 | Blackmore | Aug. 30, 1932 |
| 2,003,731 | Beito | June 4, 1935 |
| 2,089,498 | Marstersteck | Aug. 10, 1937 |
| 2,193,132 | Hynes | Mar. 12, 1940 |
| 2,274,711 | Krause | Mar. 3, 1942 |
| 2,293,700 | Curtiss | Aug. 25, 1942 |